United States Patent
Chang et al.

(10) Patent No.: US 9,641,861 B2
(45) Date of Patent: May 2, 2017

(54) METHOD AND INTEGRATED CIRCUIT FOR VIDEO PROCESSING

(75) Inventors: Te-Hao Chang, Taipei (TW);
Siou-Shen Lin, Taipei County (TW);
Chin-Chuan Liang, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 2266 days.

(21) Appl. No.: 12/019,850

(22) Filed: Jan. 25, 2008

(65) Prior Publication Data
US 2009/0190037 A1    Jul. 30, 2009

(51) Int. Cl.
| | |
|---|---|
| H04N 19/56 | (2014.01) |
| H04N 19/57 | (2014.01) |
| H04N 19/176 | (2014.01) |
| H04N 19/102 | (2014.01) |
| H04N 19/61 | (2014.01) |
| H04N 19/137 | (2014.01) |
| H04N 19/527 | (2014.01) |
| H04N 19/533 | (2014.01) |

(52) U.S. Cl.
CPC ........... *H04N 19/57* (2014.11); *H04N 19/102* (2014.11); *H04N 19/137* (2014.11); *H04N 19/176* (2014.11); *H04N 19/527* (2014.11); *H04N 19/533* (2014.11); *H04N 19/56* (2014.11); *H04N 19/61* (2014.11)

(58) Field of Classification Search
CPC .... H04N 19/56; H04N 19/102; H04N 19/137; H04N 19/527
See application file for complete search history.

(56) References Cited

U.S. PATENT DOCUMENTS

| | | | |
|---|---|---|---|
| 6,014,181 A | 1/2000 | Sun | |
| 6,509,930 B1 * | 1/2003 | Hirano et al. | 348/452 |

(Continued)

FOREIGN PATENT DOCUMENTS

| | | |
|---|---|---|
| CN | 1688165 | 10/2005 |
| EP | 1841231 A1 * | 10/2007 |

(Continued)

OTHER PUBLICATIONS

English abstract of CN1688165, pub. Oct. 26, 2005.
English language translation of abstract of TW 1274509 (published Feb. 21, 2007).

*Primary Examiner* — Andrew Chriss
*Assistant Examiner* — Salvador E Rivas
(74) *Attorney, Agent, or Firm* — McClure, Qualey & Rodack, LLP

(57) ABSTRACT

An integrated circuit capable of video processing and a method thereof is disclosed. The integrated circuit comprises an image information generator, an adaptive motion vector (MV) candidate generator, and a block matching unit. The image information generator receives reference and current video data to determine image information. The adaptive MV candidate generator, coupled to the image information generator, receives the reference and current video data to generate spatial and temporal MV candidates, and generates an updated MV candidate based on the image information. The block matching unit, coupled to the adaptive MV candidate generator, receives the spatial and temporal MV candidates and the updated MV candidate and performs block matching to determine an output MV therefrom.

13 Claims, 3 Drawing Sheets

(56) References Cited

U.S. PATENT DOCUMENTS

| | | |
|---|---|---|
| 7,809,063 B2 | 10/2010 | Lin |
| 2002/0171759 A1* | 11/2002 | Handjojo et al. ............. 348/452 |
| 2003/0076997 A1* | 4/2003 | Edanami ...................... 382/218 |
| 2004/0071215 A1* | 4/2004 | Bellers .................... 375/240.16 |
| 2004/0114688 A1* | 6/2004 | Kang ...................... 375/240.12 |
| 2005/0147167 A1* | 7/2005 | Dumitras et al. ........ 375/240.16 |
| 2005/0243927 A1 | 11/2005 | Hubrich et al. |
| 2006/0133495 A1* | 6/2006 | Ye et al. .................. 375/240.16 |
| 2006/0215758 A1* | 9/2006 | Kawashima ............. 375/240.16 |
| 2009/0002553 A1* | 1/2009 | Living ......................... 348/452 |
| 2010/0165210 A1* | 7/2010 | Tappermann et al. ........ 348/699 |

FOREIGN PATENT DOCUMENTS

| | | |
|---|---|---|
| TW | I274509 | 2/2007 |
| WO | WO 2005/069633 | 7/2005 |

* cited by examiner

METHOD AND INTEGRATED CIRCUIT FOR VIDEO PROCESSING

BACKGROUND OF THE INVENTION

Field of the Invention

The invention relates in general to video processing, and in particular, to a motion estimation method and an integrated circuit capable of video processing.

Description of the Related Art

Block-based video coding standards such as MPEG 1/2/4 and H.26x achieve data compression by reducing temporal redundancies between video frames and spatial redundancies within a video frame. The video processing includes all processes using motion information and image information, such as video coding and frame rate conversion.

Each video frame comprises an array of pixels. A macroblock (MB) is typically composed of 16×16 pixels, and a coding unit can be a complete MB or sub-partitioned blocks such as 16×8, 8×16, 8×8, 8×4, 4×8, or 4×4. It is common to estimate movement of an image between frames on a block basis, referred to as motion estimation. Motion estimation typically comprises comparing a macroblock in the current frame to a number of macroblocks from reference frames for similarity. The spatial displacement between the macroblock in the current video frame and the most similar macroblock in the reference frames is represented by a motion vector (MV). Motion vectors may be estimated to within a fraction of a pixel, by interpolating pixels from the reference frames.

FIG. 1 depicts the process of motion estimation, where 1a is a current video frame and 1b is a previous (reference) video frame. Motion estimation involves searching object 10a of a current video frame 1a in a search window SW of a previous video frame 1b to find an object 10b being a best matched object. The spatial displacement from a collocated position of object 10a to 10b is the motion vector.

Motion estimation is aimed to search for a block in a predetermined search range with the lowest estimation error, and obtain a motion vector. Existing methods include full search which computes all possible motion vector candidates in the search range, 3D recursive search which uses a random factor to update motion vectors, and some fixed scenario search methods. These motion estimation methods are either having a slow convergence rate for the motion vector estimation, uncontrollable motion estimation due to the random factor, or not suitable for true motion estimation.

BRIEF SUMMARY OF THE INVENTION

A detailed description is given in the following embodiments with reference to the accompanying drawings.

An integrated circuit capable of video processing comprises an image information generator, an adaptive motion vector (MV) candidate generator, and a block matching unit. The image information generator receives reference and current video data to determine image information. The adaptive MV candidate generator, coupled to the image information generator, receives the reference and current video data to generate a set of MV candidates, and generates an updated MV candidate based on the image information. The block matching unit, coupled to the adaptive MV candidate generator, receives the MV candidates regarding to the updated MV candidate to determine an output MV therefrom.

According to another embodiment of the invention, an integrated circuit capable of video processing is disclosed, comprising an image information generator, an adaptive motion vector MV candidate generator, and a block matching unit. The image information generator receives reference and current video data to determine image information. The adaptive MV candidate generator, coupled to the image information generator, determines a search range size based on the image information, and receives the reference and current video data to generate MV candidates according to the search range size. The block matching unit, coupled to the adaptive MV candidate generator, receives the MV candidates and performs block matching to determine an output MV therefrom.

According to yet another embodiment of the invention, a method for video processing is provided, comprising receiving reference and current video data to determine image information, receiving the reference and current video data to generate MV candidates, generating an updated MV candidate based on the image information, and receiving the spatial and temporal MV candidates with regards to the updated MV candidate to perform block matching to determine an output MV.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Motion estimation of video encoding may be implemented by various approaches such as a full search, 3-step search, and 3-dimensional (3-D) recursive search algorithms by assuming various certain spatial-invariant motion models to maximize temporal correlation.

The full search algorithm utilizes all possible MV candidates in a predetermined search range to search for the minimum spatial estimation error therefrom, thus is computation-intensive and time-consuming, and not a feasible solution for true motion estimation applications.

Figure 2:
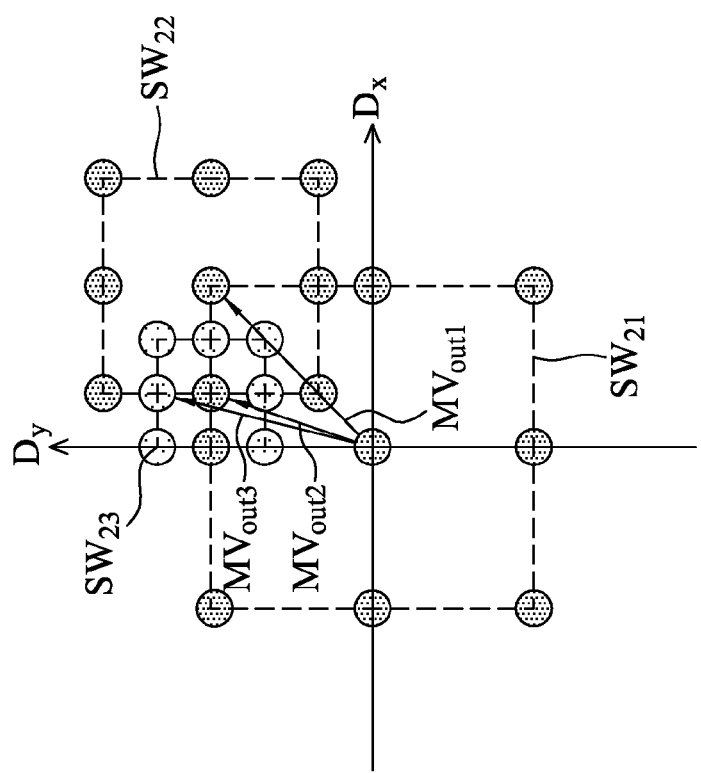
FIG. 2 shows MV candidate selection using a 3-step search algorithm.

The 3-step search algorithm conducts motion estimation 3 times with 3 search windows with difference window sizes (search range size), and each search is based on the reference search result and comprises a refined resolution over a preceding resolution. FIG. 2 shows MV candidate selection using a 3-step search algorithm, comprising a first search window $SW_{21}$, second search window $SW_{22}$, and third search window $SW_{23}$. Motion vector $MV_{out1}$ is computed in the first round of motion estimation based on a first search window $SW_{21}$ with coarse pixel resolution, thus a second round of motion estimation is conducted in a refined search window $SW_{22}$, producing a second motion vector $MV_{out2}$, in turn to generate an even more precise motion vector $MV_{out3}$ in a third search window $SW_{23}$. The 3-step search algorithm is more efficient than the full search algorithm due to less MV candidate generation, requiring less data computation and rendering a faster convergent speed to produce the output motion vector.

Figure 1:
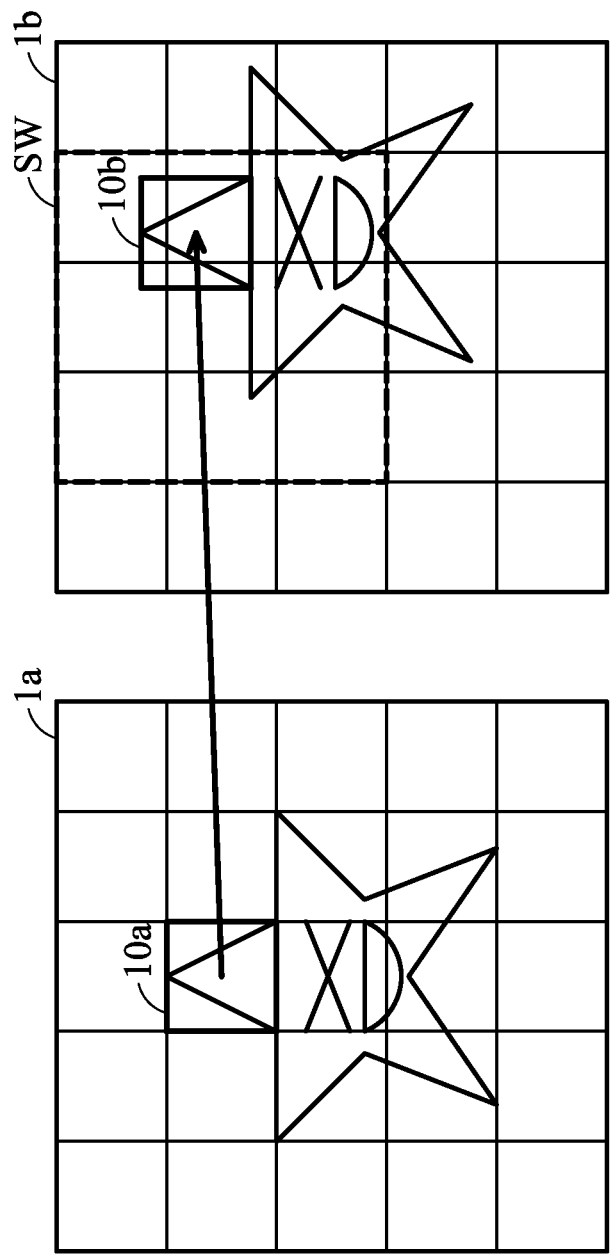
FIG. 1 illustrates a motion estimation process.
Figure 3:
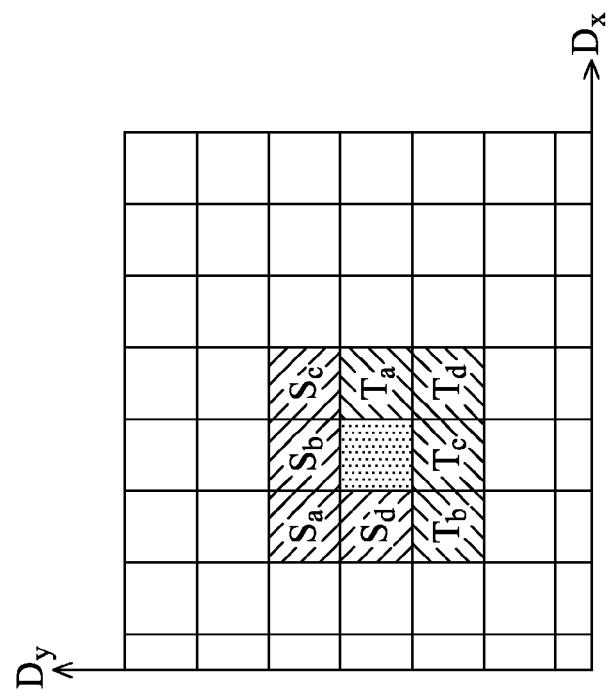
FIG. 3 depicts MV candidate selection using a 3-D recursive search algorithm.

The 3-D recursive search is a block based motion estimation algorithm employing a small number of MV candidates obtained from spatio-temporal predictions. The 3-D recursive search algorithm assumes objects are smaller than block, so that the MV from a neighboring block is a good estimate for the MV candidate of the current block. The blocks are processed in a certain order, for example, from left to right and top to bottom, so that some neighboring blocks that have already been estimated for MVs can provide spatial MV candidates for the current block, while the other blocks that have not been processed take the MVs from the reference frame to provide a temporal MV candidate for the current block. FIG. 3 depicts MV candidate selection using the 3-D recursive search algorithm, comprising spatial MV candidates $S_a$ through $S_d$ and temporal MV candidates $T_a$ through $T_d$. Along with the spatial and temporal MV candidates there are also updated MV candidates generated by random vector $MV_{ramd}$ to provide non-constant motion of the objects. The values of the update vectors indicate the movement variation of the objects from frame to frame, large update vectors result in large movement, and vice versa. For each MV candidate the motion estimation error is calculated. The candidate with the lowest motion estimation error is chosen as the output motion vector for that block. The algorithm uses a normal raster scan order to go through the blocks.

Figure 4:
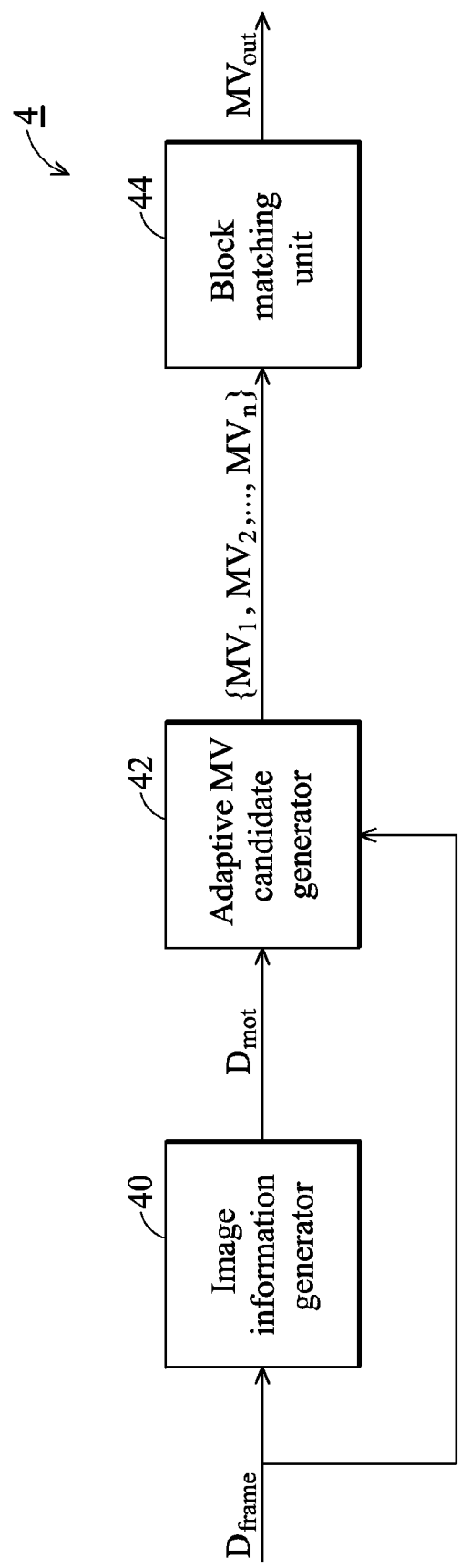
FIG. 4 is a block diagram of an exemplary apparatus for motion estimation according to the invention.

FIG. 4 is a block diagram of an exemplary apparatus for motion estimation according to the invention, comprising image information generator 40, adaptive MV candidate generator 42, and block matching unit 44. Image information generator 40 is coupled to adaptive MV candidate generator 42, and subsequently to block matching unit 44.

Image information generator 40 receives reference and current video data $D_{frame}$ to determine image information. The image information may be a measure or may be related to one or more of the following: motion complexity, motion speed, block difference, global motion direction, texture, and image complexity.

For example, the image information may be a measure of motion complexity determined by a sum of differences between motion vectors of video data $D_{frame}$, and is provided in Eq(1). The value of the motion complexity indicates a variance of motion vectors in a frame, for example, this value equals to zero if all elements in the frame move in the same direction with the same speed. A large motion complexity indicates a more complicated movement within the frame.

$$E(|MV_{nm,x}-MV_{(n-1)m,x}|)+(|MV_{nm,y}-MV_{(n-1)m,y}|) \quad \text{Eq(1)}.$$

where $MV_{nm,x}$ and $MV_{nm,y}$ are motion vectors of the reference video data frame at block (n, m) along x and y directions, and $MV_{(n-1)m,x}$ and $MV_{(n-1)m,y}$ are motion vectors of the reference video data frame at block (n−1, m) along x and y directions in a region or in a frame.

The image information may indicate a motion speed of a frame, for example, an averaged motion speed can be determined by a sum of motion vectors of the current video data. The motion speed may be computed using Eq(2) and Eq(3). A larger value of $N_{nm}$ indicates more objects in a frame have a fast movement.

$$N_{nm} = \sum (|MV_{nm,x}| + |MV_{nm,y}|) \quad \text{Eq (2)}$$

$$\sum N_{mn}, N_{mn} = \begin{cases} 1, & |MV_{nm}| \geq th_{spd} \\ 0, & |MV_{nm}| < th_{spd} \end{cases} \quad \text{Eq (3)}$$

where $MV_{nm,x}$ and $MV_{nm,y}$ are motion vectors of the video data frame along x and y directions, $N_{nm}$ is the motion speed, and $th_{pd}$ is a motion speed threshold.

In another embodiment, the image information is a block difference determined by a sum of differences between pixels of macroblocks of the reference and current video data, expressed by Eq(4).

$$\sum_{(x,y) \in block} |P_{(x,y),prev} - P_{(x,y),curr}| \quad \text{Eq (4)}$$

where $P_{(x,y),prev}$ is a pixel in the reference video frame, and $P_{(x,y),curr}$ is a pixel in the current video frame. The low value of the block difference represents large similarity between the current and reference video frames.

The image information may also be represented by a global motion direction, where several motion vectors are taken from a number of predetermined locations in a block of the reference video frame, say 9 locations, the motion vectors are then sorted out in a low-to-high order and a median is identified therefrom as the global motion direction of the block.

Some other image information examples may relate to texture or complexity of image. Examples of the image information and their derivation equations and algorithms mentioned above are only some of the possible implementations for the present invention, and should not be interpreted as a limitation to the scope of invention.

Adaptive MV candidate generator 42 receives image information from image information generator 40 to generate MV candidates $\{MV_1, MV_2, \ldots, MV_n\}$ using a motion estimation algorithm. In the example of 3-D recursive search, adaptive MV candidate generator 42 receives reference and/or current video data $D_{frame}$ to generate spatial and temporal MV candidates, and receives the image information to generate an updated MV candidate. In other embodiments of full search and 3-step search algorithms, adaptive MV candidate generator 42 determines a search range size based on the image information, and receives reference and/or current video data $D_{frame}$ to generate MV candidates according to the search range size.

In the case of 3-D recursive search, adaptive MV candidate generator 42 utilizes reference and current video frames $D_{frame}$ to provide spatial and temporal MV candidates, and in addition, adaptive MV candidate generator 42 may receive the image information including motion complexity, motion speed, block difference, or global motion direction information disclosed in the preceding paragraphs to generate one or more updated MV candidates. For example, adaptive MV candidate generator 42 increases the degree of predicted object motion for a simpler reference video data frame and decreases the predicted object motion for the complex reference video data frame through the updated MV candidates. In practice, adaptive MV candidate generator 42 increases the value of at least one updated MV candidate when the motion complexity is less than a motion complexity threshold, and decreases the value of at least one updated MV candidate when the motion complexity exceeds or equals to the motion complexity threshold. In an embodiment, image information carries motion speed information, adaptive MV candidate generator 42 adaptively increases the predicted object motion with feedback of a fast motion speed. An implementation of adaptive MV candidate generator 42 decreases the value of at least one updated MV candidate when the motion speed is less than motion speed threshold $th_{spd}$, and increases the updated MV candidate when the motion speed exceeds or equals to motion speed threshold $th_{spd}$. In other embodiments, the image information represents block differences, adaptive MV candidate generator 42 adaptively adjusts the predicted motion with the block difference between the current and reference video frames. Since a small block difference reflects the current video frame is very similar to the reference video frame, adaptive MV candidate generator 42 decreases the updated MV candidate when the block difference is less than a block difference threshold, and increases the MV updated MV candidate when the block difference exceeds or equals to the block difference threshold. When the image information indicates a global motion direction, adaptive MV candidate generator 42 decreases the updated MV candidate when the global motion speed is less than a global motion speed threshold, and increases the updated MV candidate when the global motion speed exceeds or equals to the global motion speed threshold.

In some embodiments, adaptive MV candidate generator 42 adjusts the updated MV candidates with a predetermined difference or gain. For example, adaptive MV candidate generator 42 generates a random vector, and adds a predetermined difference to the random vector or subtracts the predetermined difference from the random vector to generate the updated MV candidates according to the image information. Adaptive MV candidate generator 42 may also generate a random vector, and multiply a predetermined gain with the random vector or divide the random vector by the predetermined gain according to the image information, to generate the updated MV candidates.

In the cases of full search and 3-step search, adaptive MV candidate generator 42 adjusts search range size to generate MV candidates for the MVs to be searched from in accordance with the image information. When the image information carries information of motion complexity, adaptive MV candidate generator 42 conducts motion estimation in a large search range for a simpler reference video data frame and a smaller search range for more complex reference video data frame, since a large motion complexity value suggests large motion variance within a frame, and a small search range size provides smaller resolution and better motion estimation. For example, adaptive MV candidate generator 42 increases the search range size when the motion complexity is less than a motion complexity threshold, and decreases the search range size when the motion complexity exceeds or equals to the motion complexity threshold. When the image information represents the motion speed, adaptive MV candidate generator 42 adaptively increases the search range size with a fast motion speed. In an embodiment, adaptive MV candidate generator 42 decreases the search range size when the motion speed is less than motion speed threshold $th_{spd}$, and increases the search range size when the motion speed exceeds or equals to motion speed threshold $th_{spd}$. In other embodiments, when the image information carries information of block differences within a frame or between frames, adaptive MV candidate generator 42 adaptively adjusts the search range size with the block differences. An embodiment of the image information is an average of block differences between a current and a reference frame, and a small block difference average suggests most object motion is within a small range, adaptive MV candidate generator 42 decreases the search range size when the block difference average is less than a block difference threshold, and increases the MV search range size when the block difference average exceeds or equals to the block difference threshold. In another embodiment, the image information is an average of block differences within a frame, and a large block difference average suggests a complicated image or texture, and adaptive MV candidate generator 42 decreases the search range size when the block difference average exceeds or equal to the block difference threshold and vice versa. When the image information is a global motion direction, adaptive MV candidate generator 42 decreases the search range size when the global motion speed is less than a global motion speed threshold, and increases the search range size when the global motion speed exceeds or equals to the global motion speed threshold.

In the full search algorithm, adaptive MV candidate generator 42 simply adjusts the search range size to increase or decrease an amount of the MV candidates for selecting an output motion vector $MV_{out}$ through block matching. In the case of 3-step search, adaptive MV candidate generator 42 modifies the search range size by adjusting video data resolution in each search window. Adaptive MV candidate generator 42 may increase the video data resolution of each search window by 1 step unit to increase the search range size. For example, when taking search window size $MV_{k+2}$, $MV_{k+1}$, $MV_k$ as the reference search range, the motion estimation is conducted in the increased search range size $MV_{k+3}$, $MV_{k+2}$, $MV_{k+1}$ for the current video frame. Likewise, adaptive MV candidate generator 42 may decrease the video data resolution of each search window by 1 step unit to decrease the search range size, i.e., search window size $MV_{k+1}$, $MV_k$, $MV_{k-1}$. The step unit may be a pixel data, a minimal video data base, or a predetermined data base.

Some embodiments of adaptive MV candidate generator 42 add updated MV candidates to a set of MV candidates generated by a motion estimation algorithm, and some other embodiments of adaptive MV candidate generator 42 replace certain MV candidates of the set of MV candidates generated by the motion estimation algorithm by the updated MV candidates. For example, adaptive MV candidate generator 42 generates 5 MV candidates derived using 3D recursive search, and then increases to 8 MV candidates after image information feedback. In other embodiments, adaptive MV candidate generator 42 may generate 3 updated MV candidates using 3D recursive search in place of 3 out of the original 8 MV candidates.

Block matching unit 44 receives the MV candidates from adaptive MV candidate generator 42, for example, including the spatial and temporal MV candidates and updated MV candidates (e.g. 3-D recursive search example) or all MV candidates (e.g. full search and 3-step search examples). In embodiments of 3-D recursive search, block matching unit 44 receives the updated MV candidates adaptively adjusted according to the image information and the spatial and temporal MV candidates independent of the image information and it applies block matching techniques to these MV candidates, for examples, a sum-of-absolute difference (SAD), or a mean-squared-error (MSE). Block matching unit 44 then selects a matched block with a minimum difference or error or a maximum similarity, and outputs the motion vector $MV_{out}$ corresponding to the matched block. In the embodiments of full search and 3-step search, block matching unit 44 receives all MV candidates computed in the search range adaptable according to the image information and performs block matching, and determines a matched block with a minimum difference or maximum similarity from the candidate blocks, and outputs its corresponding motion vector $MV_{out}$.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An integrated circuit capable of video processing, comprising:
    an image information generator, receiving reference and current video data to determine image information;
    an adaptive motion vector (MV) candidate generator, coupled to the image information generator, receiving the reference and current video data to generate a set of MV candidates, generating at least an updated MV candidate based on the image information, and outputting the set of MV candidates regarding to the updated MV candidate; and
    a block matching unit, coupled to the adaptive MV candidate generator, receiving the set of MV candidates and performing block matching to determine an output MV;
    wherein the image information is a motion speed determined by motion vectors of the video data, and the adaptive MV candidate generator generates the updated MV candidate with reference to the motion speed;
    wherein the adaptive MV candidate generator further generates a random vector, and determines to add a predetermined difference to the random vector, or subtract the predetermined difference from the random vector according to the image information, to generate the updated MV candidate.

2. The integrated circuit of claim 1, wherein the adaptive MV candidate generator outputs the set of MV candidates along with the updated MV candidate.

3. The integrated circuit of claim 1, wherein at least one MV candidate in the set of MV candidates output from the adaptive MV candidate generator is replaced by the updated MV candidate.

4. The integrated circuit of claim 1, wherein the adaptive MV candidate generator generates the MV candidates using a 3-dimentional (3-D) recursive search algorithm.

5. An integrated circuit capable of video processing, comprising:
    an image information generator, receiving reference and current video data to determine image information;
    an adaptive motion vector (MV) candidate generator, coupled to the image information generator, receiving the reference and current video data to generate a set of MV candidates, generating at least an updated MV candidate based on the image information, and outputting the set of MV candidates regarding to the updated MV candidate; and
    a block matching unit, coupled to the adaptive MV candidate generator, receiving the set of MV candidates and performing block matching to determine an output MV;
    wherein the image information is a motion speed determined by motion vectors of the video data, and the adaptive MV candidate generator generates the updated MV candidate with reference to the motion speed;
    wherein the adaptive MV candidate generator further generates a random vector, and determines to multiply a predetermined gain with the random vector, and divide the random vector by the predetermined gain according to the image information, to generate the updated MV candidate.

6. An integrated circuit capable of video processing, comprising:
    an image information generator, receiving reference and current video data to determine image information;
    an adaptive motion vector (MV) candidate generator, coupled to the image information generator, determining a search range size based on the image information, and receiving the reference and current video data to generate MV candidates according to the search range size; and
    a block matching unit, coupled to the adaptive MV candidate generator, receiving the MV candidates and perform block matching to determine an output MV therefrom;
    wherein the image information is a motion speed determined by motion vectors of the video data, and the adaptive MV candidate generator adjusts the search range size with reference to the motion speed.

7. The integrated circuit of claim 6, wherein the adaptive MV candidate generator generates the MV candidates using full search or 3-step search algorithm.

8. A method for video processing, comprising:
    determining and deriving image information from reference and current video data;
    generating MV candidates from the reference and current video data by a fixed scenario;
    generating an updated MV candidate based on the image information;
    generating a random vector, and wherein generating the updated MV candidate further comprises determining to add a predetermined difference to the random vector, or subtract the predetermined difference from the random vector according to the image information, to generate the updated MV candidate; and
    performing block matching based on the MV candidates with regards to the updated MV candidate to determine an output MV;
    wherein the image information is a motion speed determined by motion vectors of the video data, and the adaptive MV candidate generator generates the updated MV candidate with reference to the motion speed.

9. A method for video processing, comprising:
    determining and deriving image information from reference and current video data;
    generating MV candidates from the reference and current video data by a fixed scenario;
    generating an updated MV candidate based on the image information;
    generating a random vector, and wherein generating the updated MV candidate further comprises determining to multiply a predetermined gain with the random vector, and divide the random vector by the predetermined gain according to the image information, to generate the updated MV candidate; and
    performing block matching based on the MV candidates with regards to the updated MV candidate to determine an output MV;
    wherein the image information is a motion speed determined by motion vectors of the video data, and the adaptive MV candidate generator generates the updated MV candidate with reference to the motion speed.

10. An integrated circuit capable of video processing, comprising:
    an image information generator, receiving reference and current video data to determine image information;
    an adaptive motion vector (MV) candidate generator, coupled to the image information generator, receiving the reference and current video data to generate a set of MV candidates, generating at least an updated MV candidate based on the image information, and outputting the set of MV candidates regarding to the updated MV candidate; and
    a block matching unit, coupled to the adaptive MV candidate generator, receiving the set of MV candidates and performing block matching to determine an output MV;
    the image information is a block difference determined by a sum of differences between pixels of blocks of the reference and current video data, and the adaptive MV candidate generator generates the updated MV candidate with reference to the block difference.

11. A method for video processing, comprising:
    determining and deriving image information from reference and current video data;
    generating MV candidates from the reference and current video data by a fixed scenario;
    generating an updated MV candidate based on the image information; and
    performing block matching based on the MV candidates with regards to the updated MV candidate to determine an output MV;
    the image information is a block difference determined by a sum of differences between pixels of blocks of the reference and current video data, and the adaptive MV candidate generator generates the updated MV candidate with reference to the block difference.

12. An integrated circuit capable of video processing, comprising:
    an image information generator, receiving reference and current video data to determine image information;
    an adaptive motion vector (MV) candidate generator, coupled to the image information generator, determining a search range size based on the image information, and receiving the reference and current video data to generate MV candidates according to the search range size; and
    a block matching unit, coupled to the adaptive MV candidate generator, receiving the MV candidates and perform block matching to determine an output MV therefrom;
    wherein the image information is a block difference determined by a sum of differences between pixels of blocks of the reference and current video data, and the adaptive MV candidate generator adjusts the search range size with reference to the block difference.

13. An integrated circuit capable of video processing, comprising:
    an image information generator, receiving reference and current video data to determine image information;
    an adaptive motion vector (MV) candidate generator, coupled to the image information generator, determining a search range size based on the image information, and receiving the reference and current video data to generate MV candidates according to the search range size; and
    a block matching unit, coupled to the adaptive MV candidate generator, receiving the MV candidates and perform block matching to determine an output MV therefrom;
    wherein the image information is a global motion speed determined by an average of MVs at predetermined locations of the video data, and the adaptive MV candidate generator adjusts the search range size with reference to the global motion speed.

* * * * *